United States Patent [19]
McLintic

[11] 3,768,900
[45] Oct. 30, 1973

[54] SLIDE PROJECTORS
[75] Inventor: William James McLintic, London, England
[73] Assignee: Thorn Lighting Limited, London, England
[22] Filed: Dec. 16, 1970
[21] Appl. No.: 98,710

[30] Foreign Application Priority Data
Dec. 17, 1969 Great Britain................ 61,558/69

[52] U.S. Cl............. 353/98, 240/41.35 R, 240/103, 350/293
[51] Int. Cl. ......................................... G03b 21/28
[58] Field of Search.............................. 353/98, 99; 240/41.35 R, 103; 350/295, 294, 293

[56] References Cited
UNITED STATES PATENTS
3,381,575  5/1968  Levin................................ 353/98
1,248,456  12/1917  Clark................................... 353/99
1,502,453  7/1924  Wood.......................... 240/41.35 R
R17,038  7/1928  Ballman et al....................... 353/98

Primary Examiner—William D. Martin, Jr.
Attorney—Joseph C. Ryan and Robert F. O'Connell

[57] ABSTRACT

A bowl reflector of modified ellipsoidal shape is suitable for a slide projector, eliminates the need for a condenser and, when used with a flat-coil type filament lamp, enables a substantially uniform light distribution to be obtained. The regions of an ellipsoidal reflector responsible for imaging the cool, dark ends of the filament are effectively omitted from the present reflector.

4 Claims, 5 Drawing Figures

Patented Oct. 30, 1973

3,768,900

2 Sheets-Sheet 1

WILLIAM JAMES McLINTIC
INVENTOR

BY *Joseph C. Ryan*
ATTORNEY

Patented Oct. 30, 1973          3,768,900

2 Sheets-Sheet 2

WILLIAM JAMES McLINTIC
INVENTOR
BY
ATTORNEY

SLIDE PROJECTORS

The present invention relates to improvements relating to slide projectors.

Figure 1:
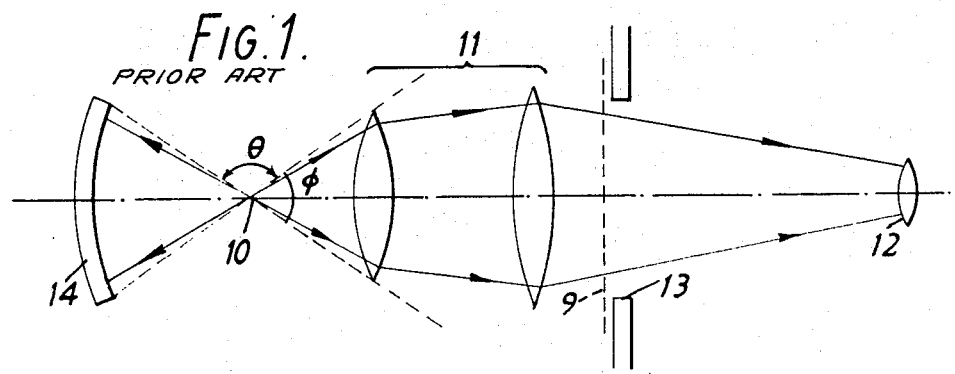

The optical system of a known slide projector is illustrated schematically in FIG. 1 of the accompanying drawings. Some of the light produced by a source 10 is emitted in the direction of a condenser lens system 11. The condenser lens system 11 causes the divergent light rays received thereby to converge towards a focus at or adjacent the nodal point of a projection lens 12. This lens 12 projects an image of an illuminated transparency 9 onto a screen (not shown). The transparency 9 is located in a gate 13 between the condenser lens system 11 and the projector lens 12. A spherical mirror 14 is provided to collect some of the light produced by the source 10 which is emitted in directions away from the condenser lens system 11. This mirror 14 has its centre of curvature coincident with the source 10 and reflects light rays back, through the source 10, towards the condenser lens system 11. Light which would otherwise be wasted is therefore utilised. A considerable proportion of the light produced by the source 10 is not collected by either the mirror 14 or the condenser lens system 12, i.e., light emitted over the angle $\theta$.

To improve the efficiency of this optical system and thereby increase the intensity of the light projected, various modifications have been made. The angle $\phi$ at the source 10, over which light is collected by the condenser lens system, may be increased by decreasing the focal length of the condenser lenses and by increasing their diameters i.e., by increasing their apertures. Furthermore, lenses having deeply curved surfaces, of conic rather than spherical configuration, have been used in attempts to improve the collection angle $\phi$, and hence reduce the complementary angle $\theta$. Larger mirrors 14 have been used in conjunction with condenser lenses of greater diameter to reduce the angle $\theta$ and thereby reduce the amount of light wasted. A further improvement can be obtained by using compact light sources, which make it possible to reduce the distance between the condenser lens system 11 and the source 10 and hence increase the collection angle $\phi$. A particularly attractive and compact source has a filament produced by winding filament wire onto a flat mandrel. Unfortunately such a filament is optically dense, and obstructs the light reflected therethrough by the mirror 14.

It would be desirable to eliminate the use of a condenser lens system altogether, both to reduce costs and to reduce the light lost by reflection at each glass-to-air surface. Reflection losses account for more than 8 percent of the light transmitted by each individual lens.

The conventional spherical mirror might be replaced by an ellipsoidal mirror. No condenser lenses would be required because the ellipsoidal mirror collects and can focus the light, produced by a source located adjacent one focal point of the mirror, to or adjacent to the nodal point of the projector lens. The ellipsoidal mirror may be of the type known as the "cold mirror," in order to minimise the amount of heat generated by the source reaching a transparency at the film gate which heat would otherwise be reflected towards the transparency. Problems arise with ellipsoidal mirrors however especially when used with compact light sources which have flattened coil filaments. In particular, the light reflected is non-uniform, so that the illumination of a transparency, and its image projected onto a screen are correspondingly non-uniform.

In accordance with one aspect of the present invention, there is provided a bowl-shaped reflector of modified ellipsoidal form having a reflecting surface composed of two part-ellipsoidal portions symmetrical about and meeting in a meridional plane of the bowl, the said surface having the shape of the surface of a body formed by parting an ellipsoid or revolution along two planes to form a slice between the two planes, removing the slice and uniting the remaining parts of the ellipsoid at their surface of parting. Further, in accordance with the invention there is provided a screen projector comprising a projection lens, a gate and a light source having a coil filament which is located adjacent one focal point of a bowl-shaped reflector of modified ellipsoidal form, having a reflecting surface composed of two part-ellipsoidal portions symmetrical about and meeting in a meridional plane of the bowl, the said surface having the shape of the surface of a body formed by parting an ellipsoid of revolution along two planes to form a slice between the two planes, removing the slice and uniting the remaining parts of the ellipsoid at their surface of parting, the light source being orientated with the principal axis of its coil filament coinciding with the said meridional plane and the arrangement being such that the projection lens is unable to produce an image of the filament itself or of a virtual image of the filament produced by the reflector. Preferably the reflector has a dichroic reflecting coating which is only partially reflecting to heat radiation, so that in use the heat generated by the light source, which reaches a film or slide located in the gate, is minimised.

The open ends of the hollow coil filament, which may be a flattened coil, are cool and dark in comparison with the remainder of the filament and the ends are not imaged and reflected by the reflector construction in accordance with this invention. In a true ellipsoidal mirror, those areas of its surface which correspond to the part, in effect, absent from the present reflector are responsible for reflecting the dark ends of the flattened coil filament and the opening through the filament. This is the reason why a true ellipsoidal mirror used with a flattened coil filament light source is unable to provide uniform illumination.

In practice, the reflector would be manufactured, by moulding. A master mould for use in producing reflectors according to the invention may be prepared initially by parting a body of true ellipsoidal shape and removing parallel or tapering slices therefrom followed by joining the remaining parts together to produce a continuous mould surface.

Figure 2:
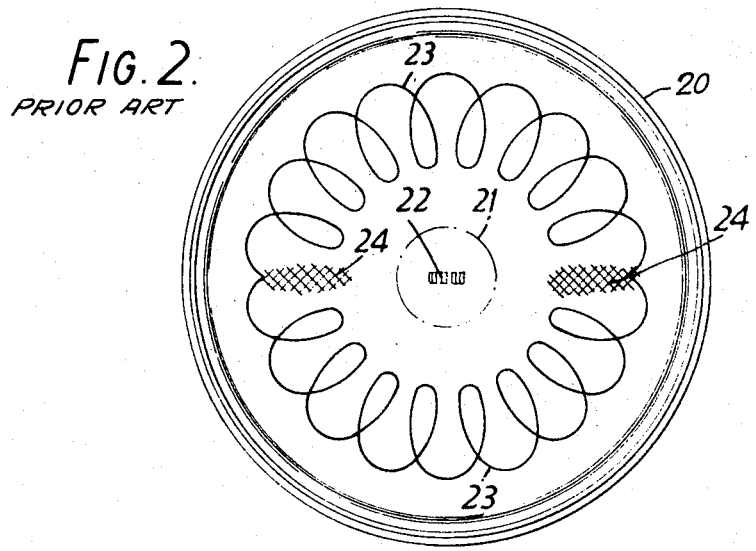
Figure 3:
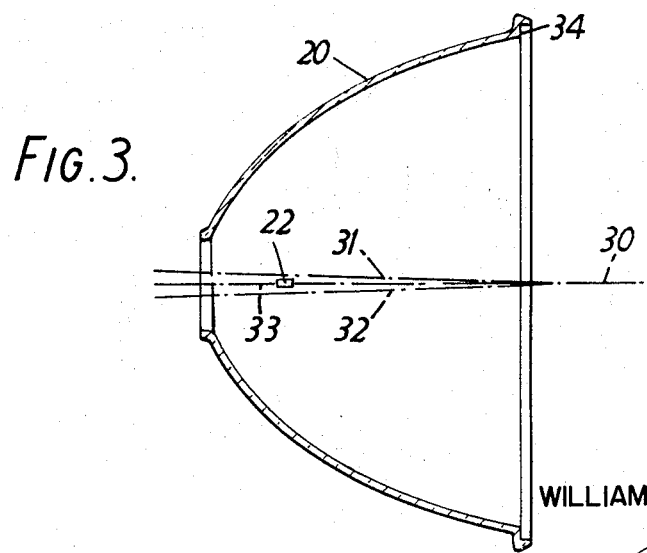
Figure 4:
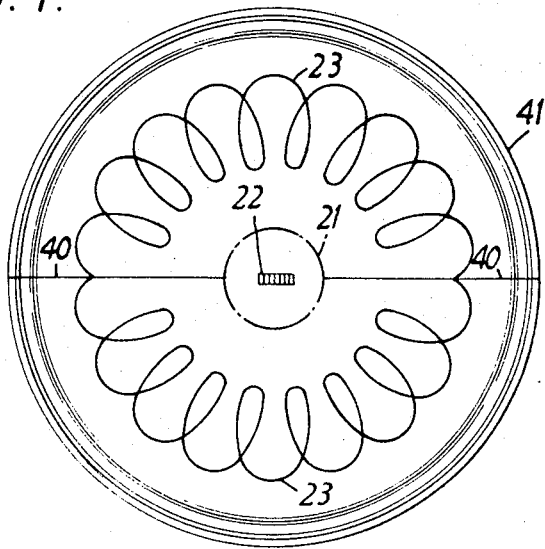
Figure 5:
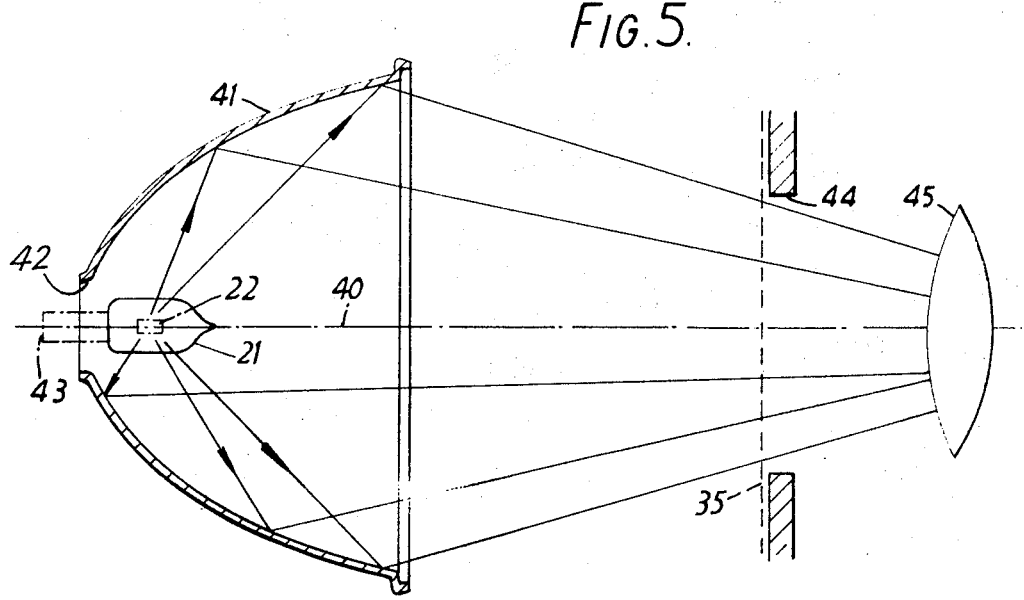

The present invention will now be described by way of example with reference to the remaining figures of the accompanying drawings, in which:

FIG. 1 is a schematic diagram of the optical system of a prior art slide projector to which previous reference has been made, FIG. 2 is an illustration of the virtual image as seen in an ellipsoidal mirror of a flattened coil filament of a light source located therein, FIG. 3 is an ellipsoidal mirror showing slices of one form which may be removed to produce a reflector according to the invention, FIG. 4 is an illustration of the virtual image as seen in a reflector according to the invention having a flattened coil filament light source located therein, and FIG. 5 is a schematic drawing of a projector embodying a reflector according to the invention.

In FIG. 2 there is illustrated the virtual image of a flattened coil filament of a light source as seen in an ellipsoidal mirror when viewed from adjacent one focus of the mirror, the filament being located adjacent the other focus of the mirror. The mirror 20 has a true ellipsoidally bowl-shaped reflecting surface and has a compact light source 21 located on the central axis of the mirror. The light source 21 has a flattened coil filament 22 which is manufactured by coiling a filament wire upon a flattened mandrel, and the source 21 is positioned such that its filament 22 is centred upon the central axis of the mirror 20. A mirror 20 of this shape used with a source 21 incorporating such a filament 22 is unable to reflect the light produced at the filament 22 in a uniform manner. As schematically shown, the turns of the filament 22 are imaged at 23. Regions 24 on the mirror surface produced images of the two ends of the filament coil. In use, the ends of the filament coil are cool relative to the turns themselves, and hence their images are dark in comparison with the images at 23. Thus the intensity of the light falling onto the mirror surface, and the intensity reflected therefrom are non-uniform.

Uniform illumination can be obtained if regions 24 are prevented from imaging the ends of the filament 22. FIG. 3 shows schematically one way in which a true ellipsoidal mirror 20, for use with a given source 21, may in effect be modified to accomplish this. The drawing shows one end of the filament 22, whose principal plane lies in a meridional plane 30 of the ellipsoidal bowl. The shape of the bowl 20 in effect is modified by making cuts 31 and 32 through the bowl, the cuts lying in two planes symmetrically disposed to either side of the meridional plane 30 of the bowl. The cuts 31 and 32 define narrow triangular slices 33 whose widths progressively increase away from the rim 34 of the bowl 20. The spacing between the cuts 31,32 in the region of the ends of the coil 22 is determined by the width of the coil, and should be equal to or greater than the width of the coil 22. The slices 33 are symmetrical about the meridional plane 30. After removing the slices, the remaining parts are united by effectively bringing the cut edges 31, 32 together and joining along the lines 40, as shown in FIG. 4. This results in a reflector having a continuous surface of modified ellipsoidal bowl-shape. As will be appreciated, the lines 40 of the joints lie on the meridional plane 30.

As will be seen in FIG. 4, the reflector 41 only produces images 23 of the turns of the coil 22. The ends of the coil 22 are not imaged by the reflector 41 owing to the absence therefrom of the triangular slices 33. Thus more uniform illumination is reflected by the reflector 41.

An alternative way of achieving the same result is obtained if the cuts 31,32, instead of defining narrow triangular slices 33, were arranged, in effect to define parallel slices (not shown). The parallel slices effectively removed should have widths which are governed by the dimensions of the flattened coil filament 22 of the lamp 21. In particular, the widths of the parallel slices should be made equal to or larger than the width of the filament. In use, it is important that the lamp 21 is so orientated that the principal plane of its flattened coil filament coincides with the plane 30. A reflector having a modified ellipsoidal bowl shape is produced by joining together the cuts which define the parallel slices.

FIG. 5 shows schematically the optical system of a screen projector embodying the reflector 41. The reflector 41 has a central aperture 42 through which the base 43 of the light source 21 projects for connection to a power supply. The light source 21 is a compact halogen lamp such as the A1/223 type. The filament 22 of the source 21 lies in the meridional plane 30, i.e., in the plane through the line 40. The reflector 41 condenses the light received thereby through the gate 44 for a film transparency 35 and onto the projection lens 45. The reflector 41 is so positioned that the angle subtended at the lens 45 by a virtual image (not shown) of the filament 22, produced by the reflector 41, is substantially the same as the angle subtended at the lens 45 by the transparency 35 to be projected, when the distance between the lens 45 and the transparency 35 is such that a clearly defined image is projected onto a screen (not shown). The positions and relative sizes of the gate 44 and filament 22 relative to the lens 45 are arranged such that as a result of the depth of focus of the lens, the latter is prevented from producing an image of the filament 22 itself and an image of what is reflected by the mirror 41. With this optical system, the angle over which the reflector 41 collects light may be made considerably greater than the collection angle $\phi$ of a conventional projector system.

Since there are no condenser lenses, reduction in manufacturing costs is possible and light losses by reflection at glass-to-air surfaces are reduced to a minimum.

Although the reflector 41 has been considered as being produced by modification of true ellipsoidal bowl, in practice the reflector is actually manufactured directly by moulding, followed by the application of a reflective coating to its surface. Such a coating is preferably of a dichroic nature. A master mould can be prepared by parting an ellipsoidal body along two parallel or diverging planes and by removing the resulting parallel or triangular slices 33 embraced thereby, after which the remaining parts are united at their parting surfaces to form the modified ellipsoidal contour required for moulding the reflector 41.

What is claimed is:

1. A screen projector comprising:
    a projection lens,
    a gate,
    a light source, said light source having a flat-coil filament, and
    a bowl shaped reflector,
    said reflector having a reflecting surface comprising two segments of ellipsoids of revolution symmetric about and meeting in a meridional plane of said reflector, the axes of revolution for said segments being symmetrically displaced on either side of said meridional plane with at least a portion of said meridional plane lying between each segment and its respective axis of revolution, and
    said coil filament being located with the principal axis of said coil lying in said meridional plane,
    whereby said reflector is unable to produce an image on the ends of said coil filament.

2. A screen projector according to claim 1, wherein said axes of revolution are parallel and spaced apart by a distance at least equal to the width of said filament.

3. A screen projector according to claim 2, wherein said axes of revolution diverge from one another with their spacing increasing away from the rim of said reflector, the spacing between said axes of revolution in the region of said filament being at least equal to the width of said filament.

4. A screen projector according to claim 1, wherein the reflecting surface of said reflector has a dichroic coating which is only partially reflective to heat radiation.

* * * * *